ELECTRICAL COMPONENT LEADS

Filed June 27, 1966

INVENTORS
ROY W. REACH
DAVID SHAPIRO
WILLIAM M. KAHN

Wolf, Greenfield & Hieken
ATTORNEYS

United States Patent Office 3,502,787

Patented Mar. 24, 1970

3,502,787

ELECTRICAL COMPONENT LEADS

Roy W. Reach, Sudbury, David Shapiro, Lincoln, and William M. Kahn, Brighton, Mass., assignors to Barry Wright Corporation, Watertown, Mass., a corporation of Massachusetts Filed June 27, 1966, Ser. No. 560,596
Int. Cl. H02q 15/08
U.S. Cl. 174—84 17 Claims

ABSTRACT OF THE DISCLOSURE

A novel bobbin is used for interconnecting electronic component leads. The bobbin is formed with a central opening at the insertion end having a diameter slightly greater than the maximum diameter of a component lead and an output end that is bifurcated into two opposed portions that are urged apart as the bobbin output end slides over the lead, this output end opening being elliptical and having minor and major diameters slightly less and greater respectively than the diameter of the lead to be surrounded. A number of lugs are circumferentially displaced about the bobbin axis intermediate the insertion end and output end for engaging the standing part of an interconnecting wire leading away from the component lead surrounded by the bobbin. The lugs are generally parallel to the bobbin axis and partially surround the insertion end structure.

The bobbin may be inserted over a free lead of a component, such as resistor, with the insertion end contiguous with the resistor body. The other lead of the component is inserted through an opening in a circuit board with the component body resting against the circuit board. A continuous filament of wire, preferably covered with decomposable insulation and fed through an opening in a wiring pen, is brought generally parallel to the circuit board around one of the lugs, then around the free component lead adjacent to the output end, then back around another lug and parallel to the component board where it may then go to another component. When all components attached to a circuit board have been wired in this manner, all the free ends of the component leads may be immersed in a hot solder or chemical bath that dissolves the thin insulation around the interconnecting wire portions in contact with the free component leads.

The present invention relates in general to component wiring and more particularly concerns a novel wiring bobbin and associated techniques which facilitate rapid and sturdy interconnection of a number of component leads. Wiring of components rapidly, inexpensively and securely is effected according to the invention.

According to the invention there is a bobbin formed with a central opening at the insertion end having a diameter slightly greater than the maximum diameter of a conducting lead to be surrounded and a diameter at the output end that is slightly less than the diameter of the lead to be surrounded, the output end being capable of expanding to that of the lead upon insertion of the bobbin over the lead so that the output end firmly grips the lead. Typically this output end is bifurcated into two opposed portions that are urged apart as the bobbin output end slides over the lead. Preferably the bobbin is formed with a number of lugs circumferentially displaced about the bobbin axis intermediate the insertion end and output end for engaging the standing part of an interconnecting wire leading away from the component lead surrounded by the bobbin. In a preferred form these lugs are generally parallel to the bobbin axis and extend from the perimeter of a conical base portion intermediate the insertion end and the output end.

In a typical installation the bobbin is inserted over a free lead of a component, such as a resistor, with the insertion end contiguous with the resistor body. Preferably, the other lead of the component is inserted through an opening in a circuit board with the component body resting against the circuit board so that the common axis of the component, bobbin and leads is substantially perpendicular to the circuit board. To interconnect a number of such components a continuous filament of wire, preferably covered with decomposable insulation and fed through an opening in a wiring pen, is brought generally parallel to the circuit board around one of the lugs, then around the free component lead adjacent to the outer end, then back around another lug and parallel to the component board where it may then go to another component. When all components attached to a circuit board have been wired in this manner, all the free ends of the component leads may be immersed in a hot solder or chemical bath that dissolves the thin insulation around the interconnecting wire portions in contact with the free component leads while the bobbin arrangement keeps the rest of the interconnecting wire portions from being immersed in the hot solder or chemical bath so that the insulation remains on these interconnecting wire portions.

The bobbin according to the invention has a number of advantages. It may be economically produced by molding in low cost plastic, such as nylon. It may be attached to a component lead with little labor by hand or with automatic methods by use of hopper feeds, since the bobbin is differentiated in shape, head to foot, to allow a device to automatically grip it preparatory to slipping over the free component lead. The bobbin inside diameter automatically adjusts to grip the lead tightly enough to hold against the tension of wire pulling up against the lugs. And this automatic adjustment accommodates both for normal variation in lead diameter and variations in molding tooling.

The technique of wiring is advantageous for a number of reasons. It eliminates an intermediate connecting device by using the free component lead as an attachment point. It allows routing and connecting of wires in a natural manner approaching closely the process of using a pencil and paper to connect dots. Where a simple coordinate system is established, the method adapts very easily to the use of aural wiring instructions through the use of prerecorded tape or similar methods to provide a rapid wiring method with a speed approaching what could be done with a pencil and paper. The method allows the operator to delete errors and correct them, thus producing finished wiring assemblies with very few errors.

Not only is the method efficient when practiced by hand, but it offers advantages over wire wrapping as an automated method in that it does not require specially designed connecting pins. Therefore, component leads can be used as a wiring point.

Accordingly, it is an important object of this invention to provide improved methods and means for electrical interconnecting.

It is another object of the invention to achieve the preceding object with means coacting with a component lead so that the component lead itself may be used as a terminal.

It is still another object of the invention to achieve the preceding objects by interconnecting a number of component leads with insulated wire whereby the connection points may be immersed in a solder bath to effect firm electrical and mechanical connection without disturbing the insulation on the interconnecting segments.

It is another object of the invention to provide improved wiring techniques.

It is still a further object of the invention to achieve the preceding objects while facilitating rapidly, securely, easily and accurately interconnecting a number of points with a single filament of insulated wire.

Numerous other features, objects and advantages of the invention will become apparent from the following specification when read in connection with the accompanying drawing in which.

The penultimate page of the application as filed includes an actual embodiment of a bobbin according to the invention.

Figures 1, 2:
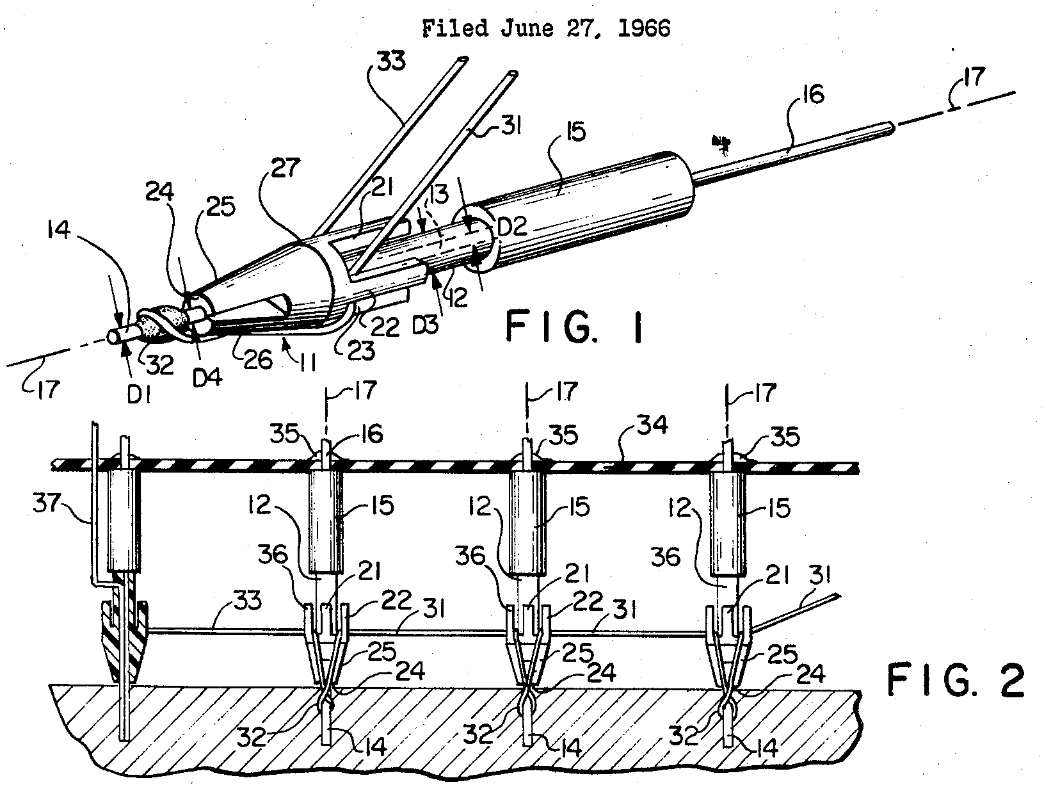
FIG. 1 is a perspective view of a bobbin according to the invention attached to a component lead.
FIG. 2 is a vertical sectional view of a portion of a circuit board supporting components interconnected according to the invention with the interconnected points immersed in a solder bath to illustrate how the bobbin according to the invention keeps the interconnecting segments clear of the solder bath.

With reference now to the drawing and more particularly FIG. 1 thereof, there is shown a perspective view of a bobbin according to the invention situated on a free component lead. The bobbin 11 is formed with an insertion end 12 formed with a central opening 13 at the insertion end of diameter D2 slightly greater than the diameter D1 of the component lead 14 extending from the body 15 of the component, such as a resistor, having a second lead 16. The outer diameter of the insertion end 12 of bobbin 11 is D3 and is sufficiently small so that insertion end 12 is inside lugs such as 21, 22, 23, there being a fourth lug not seen in the drawing so that the preferred form of the bobbin comprises four lugs in space quadrature about the common axis 17 of the bobbin 11, The component body 15 and its leads 14 and 16 as shown in FIG. 1. Bobbin 11 is formed with an output end 24 with a central opening having a diameter D4 that conforms almost exactly to the lead diameter D1 when inserted on the component lead as shown, but the diameter D4 prior to insertion is slightly less than the diameter D1 so that the output end 24 exerts a firm grip on the component lead. The output end 24 is preferably bifurcated as shown to define a pair of fingers 25 and 26 extending inwardly toward the axis 17 from the perimeter of the base 27 of the substantially frustroconical output end portion.

The form of the structure is especially advantageous from the standpoint of ease of insertion and difficulty of withdrawal. The slightly larger diameter D2 at the insertion end easily slides over the component lead 14 during insertion. At the same time the frictional forces acting on the fingers 25 and 26 during insertion are directed to the left to exert a tourque on the fingers 25 and 26 tending to rotate these fingers away from axis 17 with a consequent reduction of the frictional force. But during withdrawal the frictional forces exerted on fingers 25 and 26 are directed to the right toward the component body 15 to develop a moment on fingers 25 and 26 tending to move them toward axis 17 with a consequent increase of the frictional force between the fingers and the lead 14 to help keep the bobbin firmly in place.

Preferably the opening at the output end is of generally eliptical cross section with the major axis aligned in the gap defined by the bifurcated end. This major axis is preferably slightly larger than the maximum tolerable lead diameter. The minor axis of this opening is preferably just small enough to insure a grip on the minimum tolerable lead diameter. This preferred arrangement helps make insertion easier because frictional forces are only applied at the ends of the minor axis.

An interconnecting segment 31 of a continuous filament of wire, typically leading from another component lead, is passed over lug 22 in the space between insertion end 12 and lug 22 and against base 27, looped around free lead 14 at 32 and brought out to segment 33, typically leading to another component, in the space between the invisible lug 36, (FIG. 2) and body portion 12.

With reference to FIG. 2, there is shown a vertical sectional view through a portion of a circuit board containing a number of components interconnected with each interconnected component being like that shown in FIG. 1 with the loops 32 immersed in a solder bath. Corresponding elements are identified by the same reference symbol throughout the drawing.

Each component is shown with the upper end of body 15 flush against circuit board 34 with each lead 16 passing through an opening in the circuit board 34, soldered to the upper surface of circuit board 34 at points 35 with the respective axes 17 being essentially vertical. The leads 16 are crimped and cut off at points just above the board 34.

The loops 32 over the leads 14 are immersed in a hot solder bath 35 whose level is preferably just below the output end 24. The hot solder dissolves the insulation around the loop 32 and solders the wire to each lead 14. The remaining portions of the filament remain outside the solder bath and retain their insulation. The resultant assembly is then one that is mechanically firm, correctly and reliably interconnected, virtually free of undesired misconnections, and terminals are easily accessible for checking. At the same time, should a component ever fail in the field, replacement is easily effected.

The invention may also be used to connect a free end to the circuit board as shown at the left of FIG. 2. The bobbin 11 is then formed with a larger opening to accommodate both the component lead 14 and a second wire 37, typically 15 mils in diameter, that is sufficiently stiff to be performed in the shape illustrated. The bobbin is then slipped over both the component lead 14 and the preformed wire 37 as shown. The subsequent wiring and soldering electrically interconnects the preformed wire 37 with the adjacent component lead 14.

Figure 3:
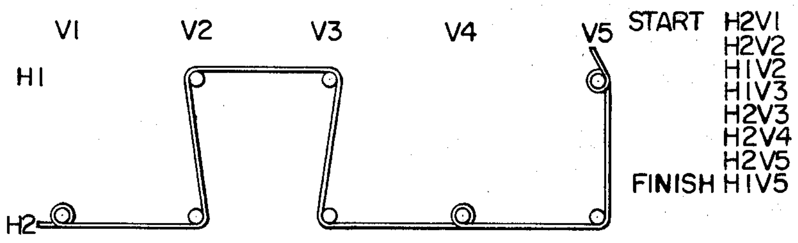
FIG. 3 is a diagrammatic view in plan illustrating how a number of points may be interconnected with a filament of wire almost as rapidly as drawing lines from point to point.

With reference to FIG. 3, there is shown a diagrammatic view of an exemplary arrangement of components at points defined by rectangular coordinates to illustrate how a desired interconnection arrangement of a prescribed number of components may be easily, rapidly and accurately effected as simply as drawing lines from dot to dot. In the specific example shown there are two rows designated H1, H2 and five columns designated V1, V2, V3, V4 and V5. Eight leads are shown interconnected in accordance with the pattern at the right. Starting with lead H2V1 the operator loops around lead H2V1, moves to the right and around lead H2V2, then up to lead H-V2, to the right to lead H1V3, down to lead H2V3, to the right to lead H2V4, to the right to lead H2V5 and finally to lead H1V5, finishing the wiring.

Figure 4:
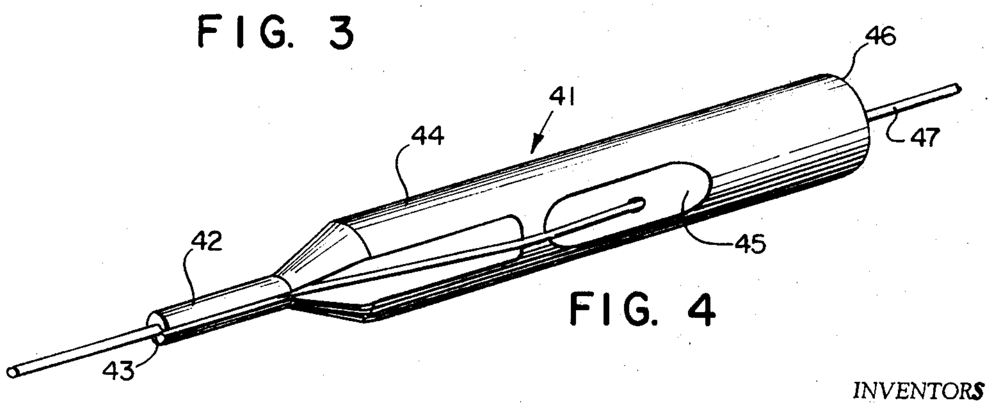
FIG. 4 is a perspective view of a preferred form of wiring pencil with portions cut away to illustrate internal structural features.

Referring to FIG. 4, there is shown a perspective view of a preferred form of wiring pen held by the operator during wiring. The pen 41 is formed with a constricted end 42 having a central opening 43 slightly greater than the diameter of the wire to be threaded, this central opening of that diameter preferably extending back into the body portion 44 as shown in the partially cut away view. The body 44 is formed with an indentation 45 to facilitate gripping by the operator. The input end 46 receives the wire 47 from a spool. Wire 47 is then paid out through opening 43 for wrapping around the leads.

According to the method a fine wire, typically number 30 wire, with a thin plastic coating, typically a double coat of polyurethane with a nylon overcoat, providing adequate electrical insulation, but which is strippable from the copper when immersed in hot solder at a temperature sufficiently low so as to avoid damaging the component and sufficiently high so as to allow the lead to accept a coating of solder and such that the residue will not affect the solder immersion bath, is employed. The wire 47 is fed continuously from a spool through the wiring pin 41 held by the operator. The wiring pin 41 is moved between a succession of points to be interconnected (wiring run), such as that represented in FIG. 3, after which the wire is cut and another run begun. This method may also be carried out by automatic means responding to coordinate information for positioning and wiring. After all the leads on a given circuit board have been interconnected, the board is inverted, and the ends having loops 32 immersed in solder bath 35 to effect the desired electrical and mechanical connection.

As a hand method the invention is accurate and fast although requiring soldering at each point. The soldering at each point is quickly effected by inverting the board and immersing the free ends in the solder bath with the illustrated bobbin arrangement providing a means for facilitating immersing only to the point of connection of the wire to the component lead while keeping the interconnecting segments of the wire outside the bath. The bobbin structure arrangement facilitates practicing this desirable wiring method with standard available components economically without modifying the component. Thus, the invention achieves the economic benefit of using a component that is mass produced for many uses.

The invention has a number of features. It eliminates intermediate connecting devices since the component lead itself is used as an attachment point. This result is facilitated by using an interconnecting wire of smaller diameter than the lead. Thus the relatively short exposed portion of the lead is sufficiently stiff to wrap the interconnecting wire around it. The invention allows routing and connecting of wires in a natural manner approaching closely the process of using a pencil and paper to interconnect dots. Where a simple coordinate system is established, the method adapts very easily to the use of aural wiring instructions through the use of pre-recorded tape or similar methods. For example, a tape recording could state what is set forth to the right of FIG. 3 from start to finish, and an operator could listen to these instructions over headphones and accomplish the wiring. The speed of wiring approaches that which could be done with pencil and paper. The method allows an operator to delete errors and correct them, thus producing finished wiring assemblies with very few errors since one and only one wire should be on each terminal. Preferably each and every point is blank when approached with the wiring pin so that the existence of a wire on a point about to be wrapped is evidence of an error. Thus if an operator approaches a point already bearing a wire, the operator may stop and immediately correct the error when this rule is about to be violated.

Not only is the method efficient from the standpoint of the hand method, but it offers advantages over wire wrappings as an automated method in that, unlike the wire wrap method, the present invention does not require specially designed connection pins so that component leads can be used as a wiring point. Still another feature of the invention is that solder joints are of especially high quality because three dimensional solder joints are produced.

There has been described novel structure and techniques offering numerous advantages with specific reference to preferred embodiments of the invention. It is apparent that those skilled in the art may now make numerous modifications of and departures from the specific embodiments described herein without departing from the inventive concepts. Consequently, the invention is to be construed as embracing each and every novel feature and novel combination of features present in or possessed by the apparatus and techniques herein disclosed.

The embodiments of the invention in which an exclusive property or privilege is claimed are defined as follows:

1. Electrical interconnecting apparatus comprising,
- means defining a bobbin formed with a central opening extending from an insertion end to an output end for surrounding an electrical lead of predetermined diameter,
- said output end including expandable means urgeable from defining a diameter slightly less than said predetermined diameter to substantially said predetermined diameter for firmly gripping a surrounded lead of said predetermined diameter,
- the diameter of said central opening at said insertion end being slightly greater than said predetermined diameter,
- said central opening being of generally elliptical cross section at said output end with major axis slightly greater than said predetermined diameter and with minor axis slightly less than said predetermined diameter,
- said electrical lead being within said central opening and extending beyond said output end,
- and an interconnecting wire of diameter much less than said predetermined diameter mechanically and electrically connected to that portion of said lead extending beyond said output end.

2. Electrical interconnecting apparatus in accordance with claim 1 wherein said output end is bifurcated.

3. Electrical interconnecting apparatus in accordance with claim 2 wherein said central opening is of generally elliptical cross section at said output end with major axis slightly greater than said predetermined diameter and lying in the gap defined by said bifurcated output end and with minor diameter slightly less than said predetermined axis.

4. Electrical interconnecting apparatus in accordance with claim 3 wherein said means defining a bobbin is formed with a plurality of lugs spaced about the axis of said central opening.

5. Electrical interconnecting apparatus in accordance with claim 2 wherein said means defining a bobbin is formed with a plurality of lugs spaced about the axis of said central opening.

6. Electrical interconnecting apparatus in accordance with claim 1 wherein said means defining a bobbin is formed with a plurality of lugs spaced about the axis of said central opening.

7. Electrical interconnecting apparatus in accordance with claim 1 and further comprising an electrical component connected to said electrical lead and having a second electrical lead coupled to the first electrical lead by said electrical component,
- and means defining a circuit board to which said second electrical lead is electrically and mechanically connected.

8. Electrical interconnecting apparatus in accordance with claim 7 and further comprising a plurality of said components in accordance with claim 9 each with a said bobbin central opening surrounding a said first lead and a said second lead electrically and mechanically connected to said circuit board,
- and means including said interconnecting wire for intercoupling at least some of said first leads.

9. Electrical interconnecting apparatus in accordance with claim 7 and further comprising,
- a third lead within said central opening and extending beyond said output end and electrically connected to a point on said circuit board for connecting the latter point to said first electrical lead.

10. A method of interconnecting which method includes the steps of,
- placing wiring bobbins over first electrical leads of a plurality of components also having second electrical leads,
- connecting said second electrical leads to respective spaced points on a circuit board so that the free ends of said first leads are separated from said circuit board by respective ones of said bobbins above a reference plane defined by the ends of said bobbins, looping a flexible wire covered by decomposable insulation around the free ends of selected ones of said first leads on the side of said reference plane away from said circuit board while securing said flexible wire to the associated bobbin on the side of said reference plane nearer said circuit board to establish standing portions of said flexible wire interconnecting said free ends which standing portions are on the side of said reference plane nearer said circuit board, and dipping said free ends in a substance which decomposes said insulation while excluding said reference plane from being embraced by said substance to establish electrical contact between said flexible wire and each free end of said selected ones of said first leads.

11. A method in accordance with claim 10 wherein said step of dipping comprises dipping said free ends into hot solder and removing the assembly to solder said selected ones of said free ends to said flexible wire while leaving the insulation on said standing portions.

12. Electrical interconnecting apparatus comprising, means defining a bobbin formed with a central opening extending from an insertion end to an output end for surrounding an electrical lead of predetermined diameter, said output end including expandable means urgeable from defining a diameter slightly less than said predetermined diameter to substantially said predetermined diameter for firmly gripping a surrounded lead of said predetermined diameter, the diameter of said central opening at said insertion end being slightly greater than said predetermined diameter, said central opening being of generally elliptical cross section at said output end with major axis slightly greater than said predetermined diameter and with minor axis slightly less than said predetermined diameter, said means defining a bobbin being formed with a plurality of lugs spaced about the axis of said central opening, said lugs being generally parallel to said axis and partially surrounding an annular section of said bobbin having said output end, whereby said annular structure and said lugs define recesses therebetween for accommodating interconnecting wires.

13. Electrical interconnecting apparatus in accordance with claim 12 wherein said output end is bifurcated.

14. Electrical interconnecting apparatus in accordance with claim 12 wherein said central opening is of generally elliptical cross section at said output end with major axis slightly greater than said predetermined diameter and lying in the gap defined by said bifurcated output end with minor axis slightly less than said predetermined diameter.

15. Electrical interconnecting apparatus comprising, means defining a unitary structure bobbin formed with a central opening extending from an insertion end to an output end for snugly surrounding an electrical lead of predetermined diameter, said bobbin having an annular portion extending from said insertion end contiguous with a generally conical portion extending from said output end to a conical base portion of diameter greater than the outside diameter of said annular portion with a plurality of lugs extending from said base portion generally parallel to and at least partially overlapping said annular portion.

16. Electrical interconnecting apparatus in accordance with claim 15 wherein said central opening is of generally elliptical cross section at said output end with major and minor axes respectively slightly greater and less than said predetermined diameter.

17. Electrical interconnecting apparatus in accordance with claim 16 wherein said output end is bifurcated to define a gap substantially collinear with said major axis.

References Cited

UNITED STATES PATENTS

| | | | |
|---|---|---|---|
| 813,998 | 2/1906 | Braine | 174—138.2 |
| 2,569,826 | 10/1951 | Packard | 85—84 |
| 2,877,441 | 3/1959 | Narozny | 339—258 |
| 3,027,418 | 3/1962 | Peterson | 29—503 XR |
| 3,152,356 | 10/1964 | Parsons | 85—84 XR |
| 3,217,584 | 11/1965 | Amesbury. | |
| 3,292,051 | 12/1966 | Olney et al. | |

DARRELL L. CLAY, Primary Examiner

U.S. Cl. X.R.

29—626, 471.1; 174—68.5; 317—101; 339—17, 275